United States Patent [19]
Oprea

[11] Patent Number: 5,323,456
[45] Date of Patent: Jun. 21, 1994

[54] DIGITALLY CONTROLLED RINGER SIGNAL GENERATION

[75] Inventor: Dan R. F. Oprea, Kanata, Canada

[73] Assignee: Mitel Corp., Kanata, Canada

[21] Appl. No.: 894,632

[22] Filed: Jun. 5, 1992

[30] Foreign Application Priority Data

Jun. 12, 1991 [CA] Canada .................. 2044437

[51] Int. Cl.$^5$ ............... H04M 1/26; H04M 1/54; H04M 3/02; G08B 3/00
[52] U.S. Cl. ..................... 379/375; 379/373; 379/418; 340/384.5
[58] Field of Search ............... 379/375, 373, 418, 372, 379/252, 253, 254; 340/384 E, 325.44

[56] References Cited

U.S. PATENT DOCUMENTS

| | | | |
|---|---|---|---|
| 4,491,691 | 1/1985 | Embree et al. ............... | 379/375 |
| 4,508,937 | 4/1985 | Burger et al. ............... | 379/373 |
| 4,567,333 | 1/1986 | Embree et al. ............... | 379/375 |
| 4,608,686 | 8/1986 | Barsellotti ............... | 370/69.1 |
| 4,626,799 | 12/1986 | Matievic ............... | 340/384 E |
| 4,631,361 | 12/1986 | Miller ............... | 379/373 |
| 5,001,748 | 3/1991 | Burns et al. ............... | 379/418 |
| 5,200,994 | 4/1993 | Sasano et al. ............... | 379/375 |

*Primary Examiner*—James L. Dwyer
*Assistant Examiner*—Scott L. Weaver
*Attorney, Agent, or Firm*—Antonelli, Terry, Stout & Kraus

[57] ABSTRACT

A method and apparatus, of producing an alarm or ringing signal by providing a first pulse signal having a predetermined pulse width to define an alarm or ringing signal amplitude, and modulating the pulse signal with a second pulse signal having a pulse rate at least an order lower than the frequency of the first pulse signal to define the alarm or ringing signal frequency, averaging the modulated first pulse signal in a loudspeaker voice coil and reproducing the result in the loudspeaker to provide the alarm or ringing signal.

13 Claims, 4 Drawing Sheets

DIGITALLY CONTROLLED RINGER SIGNAL GENERATION

FIELD OF THE INVENTION

This invention relates to a ringing generator for telephones, and which can be used to provide other alarm sounds in telephones and other products.

BACKGROUND TO THE INVENTION

Until recently, most telephones contained a bell ringer operated by a 90 volt ringing signal transmitted along the telephone lines from a telephone switching office. More recently, many telephones have been made with local sound generators in which two alternating tones are reproduced in a local speaker to create a warble. Where these telephones are of digital type, for example, digitally generated signals are converted to analog, and the analog signals are reproduced in a loudspeaker. The volume of the sound is controlled in an amplifier of the analog signal.

Normally telephones provide only an alternating two tone signal which indicates to a user that there is an incoming call to the telephone. Such ringers make no provision for specialized alarm ringing at different ringing frequencies or at a different cadence than normal ringing, and cannot provide specialized ringing frequencies for calls directed to different members of the household.

SUMMARY OF THE PRESENT INVENTION

The present invention provides a digital ringing generator which does not require the use of a digital to analog converter. The digital ringing signal is generated in a manner which can be reproduced by a loudspeaker, which itself performs an averaging function.

The present invention also facilitates the generation of different ringing frequencies and variations of volume without the use of a variable gain amplifier. Indeed, an amplifier used to drive the loudspeaker is a simple digital amplifier.

Further, the present invention can provide different ringing frequencies and different cadences for specialized purposes such as alarming, specialized ringing for each member of the household, etc., in a simple and digitally controlled manner.

Simply put, the frequency of the generated signal is controlled by modifying the dividing rate of a basic digital signal in a programmable counter. The volume is controlled by modifying the pulse width (pulse width modulation) of pulses forming the basic digital signal.

A digital to analog converter function is effected within a loudspeaker itself which averages the digital signal in the loudspeaker voice coil inductance. The speaker driving amplifier can be a simple switching transistor, driving an ordinary magnetic speaker.

In an embodiment to be described below, four frequency combinations and four levels of volume are obtained. In a successful embodiment, the total number of digital gates utilized to implement the invention was 120. Additional volume steps and frequency combinations would increase the complexity only marginally. On the other hand, a digital signal processor used to provide the equivalent function is estimated to have a required minimum number of 1,000 gates.

In accordance with an embodiment of the invention, an alarm or ringing signal generator is comprised of apparatus for generating a first signal having a predetermined pulse width for defining an alarm signal amplitude, apparatus for modulating the pulse signal with a lower frequency second pulse signal having a frequency defining an alarm or ringing signal frequency, apparatus for averaging the modulated pulse signal and acoustically reproducing the averaged modulated pulse signal to produce the alarm or ringing signal.

In accordance with another embodiment, a method of producing an alarm or ringing signal is comprised of providing a first pulse signal having a predetermined pulse width to define an alarm or ringing signal amplitude, and modulating the pulse signal with a second pulse signal having a frequency at least an order lower than the frequency of the first pulse signal to define the alarm or ringing signal frequency, averaging the modulated first pulse signal and reproducing the result in a loudspeaker to provide the alarm or ringing signal.

In accordance with another embodiment a method of generating an alarm is comprised of designating a different alarm signal for each person of a group of persons or for a particular alarm condition, storing a digital code corresponding to each different alarm signal in a memory, receiving an alarm enable signal containing a designation of a particular person, retrieving one of the digital codes corresponding to the enable signal from the memory, and enabling an alarm signal generator using the one digital code to generate a unique alarm corresponding to the one digital code.

BRIEF INTRODUCTION TO THE DRAWINGS

An understanding of the invention will be obtained by reference to the detailed description below, in conjunction with the following drawings, in which.

DESCRIPTION OF A PREFERRED EMBODIMENT

Figure 1:
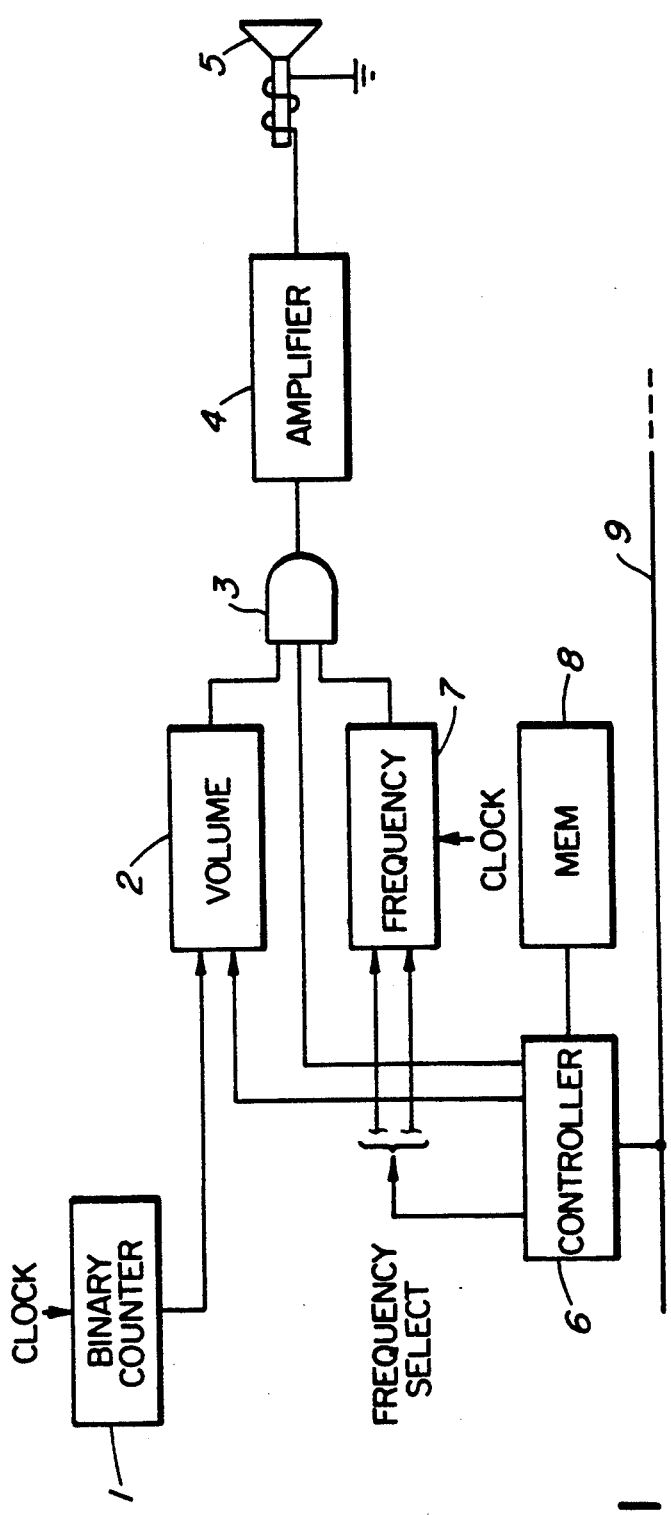
FIG. 1 is a basic block diagram of the invention.

Turning to FIG. 1, a clock signal is applied to a binary counter 1. The binary counter provides binary output count signals of the clock to a volume control circuit 2. The output of volume control circuit 2 is applied to one input of AND gate 3. The output of AND gate 3 is applied to digital amplifier 4 which can be a simple switching transistor. The output of amplifier 4 is applied to the voice coil of a loudspeaker 5.

A controller 6 is connected to volume control 2, and to a second input of AND gate 3.

In operation of the above, binary counter 1 provides output signals representative of a binary count of the clock signal, i.e. having different pulse lengths on each of plural pulse count terminals, which signals are applied to volume control circuit 2. For example, the binary counter 1 can count up to e.g. binary 3 and then repeat cyclically. Alternatively it can count up to e.g. binary 8 and then repeat cyclically.

The volume control 2 circuit has, in one successful embodiment, a two terminal input from processor 6 which can select four binary count values out of the binary count output from counter 1.

Thus the output signal from volume control 2 will be a repetitive pulse having a length and repetition rate which is determined by the binary count value selected by the controller 6. This signal is applied to one input of AND gate 3.

A clock frequency of 1 MHz was used in a 4 bit binary counter in a successful prototype of the invention, to establish the volume signal applied to AND gate 3.

To establish the ringing frequency, a clock signal is applied to frequency control circuit 7, which contains a programmable counter. The particular count is selected by controller 6 which selects the particular frequencies used for the ringer, and determines when the high and low frequencies are to be generated, i.e. by controlling the counter, so as to warble the signal at a controlled rate. The basic clock rate used in a successful prototype was 1 MHz; the programmable counter set a ringer frequency signal in the range of 350 Hz to 700 kHz (one pair of frequencies selected was 348 Hz and 445 Hz).

The output signal from frequency control 7 is applied to AND gate 3.

The input from controller 6 to gate 3 is a ringing signal cadence control, i.e. ringer start, ringer stop, (two seconds on and two seconds off).

The resulting output signal of gate 3 is a 2 second pulse signal in a 4 second recurring cycle in which each pulse signal is formed of alternating 348 Hz and 445 Hz pulses (in one embodiment) and each pulse of 348 Hz or 445 Hz signal, is formed of pulses which are high or low at a rate and pulse period which is controlled by the volume pulse length. Thus for example as will be described in more detail later with reference to FIG. 5, each burst of 348 Hz signal might last for one-quarter second, which means that within that one-quarter second, there would be 87 pulses. This is followed by a one-quarter second burst of 445 Hz signal, to form a warble. The volume control at one level of volume selected by a particular binary value provides each of the 87 pulses to be formed of 128 KHz pulses, each of these inaudible pulses having a selectable pulse length which controls the energy level and thus the volume. A higher volume selection would result from a binary count signal having increased 128 kb/s pulse lengths (e.g. binary 3 and 4, rather than binary 2 and 4), which results in a higher energy level per pulse.

Thus the cadence (two seconds on, two seconds off) is modulated in AND gate 3 by the warbling frequency signal output from frequency control 7, which is modulated by the volume control 2 output signal. The output signal of AND gate 3 is amplified in digital amplifier 4, and is averaged in the voice coil of speaker 5. The result is analog reproduction of the signal with desired amplitude and frequencies.

It should be noted that either of the two alternating frequencies could have different amplitudes, the controller 6 selecting different binary value counts, as it controls at any given instant which frequency is output from frequency control 7. Further, under control of controller 6, different warble arrangements and different frequencies can be selected, thus affording different meanings to listeners. For example, there could be an emergency weather alarm (e.g. tornado warnings), a telephone off-hook warning, different ringing frequencies or cadences for different members of the household which use the telephone, special rings announcing long distance calls, special rings announcing predetermined source telephones, etc.

A memory 8 associated with the controller is used to store codes for controlling the microprocessor to cause the alarm or ringing generator to generate different sounding acoustic signals, as described herein, to designate different alarms or to designate a call to different people. These codes are retrieved upon receipt of a processor control signal from a telephone line or other line 9, generated by a switching office or head end. The processor control signal could be a digital code, a particular ringing signal, an originating call designating number, etc.

Figure 2:
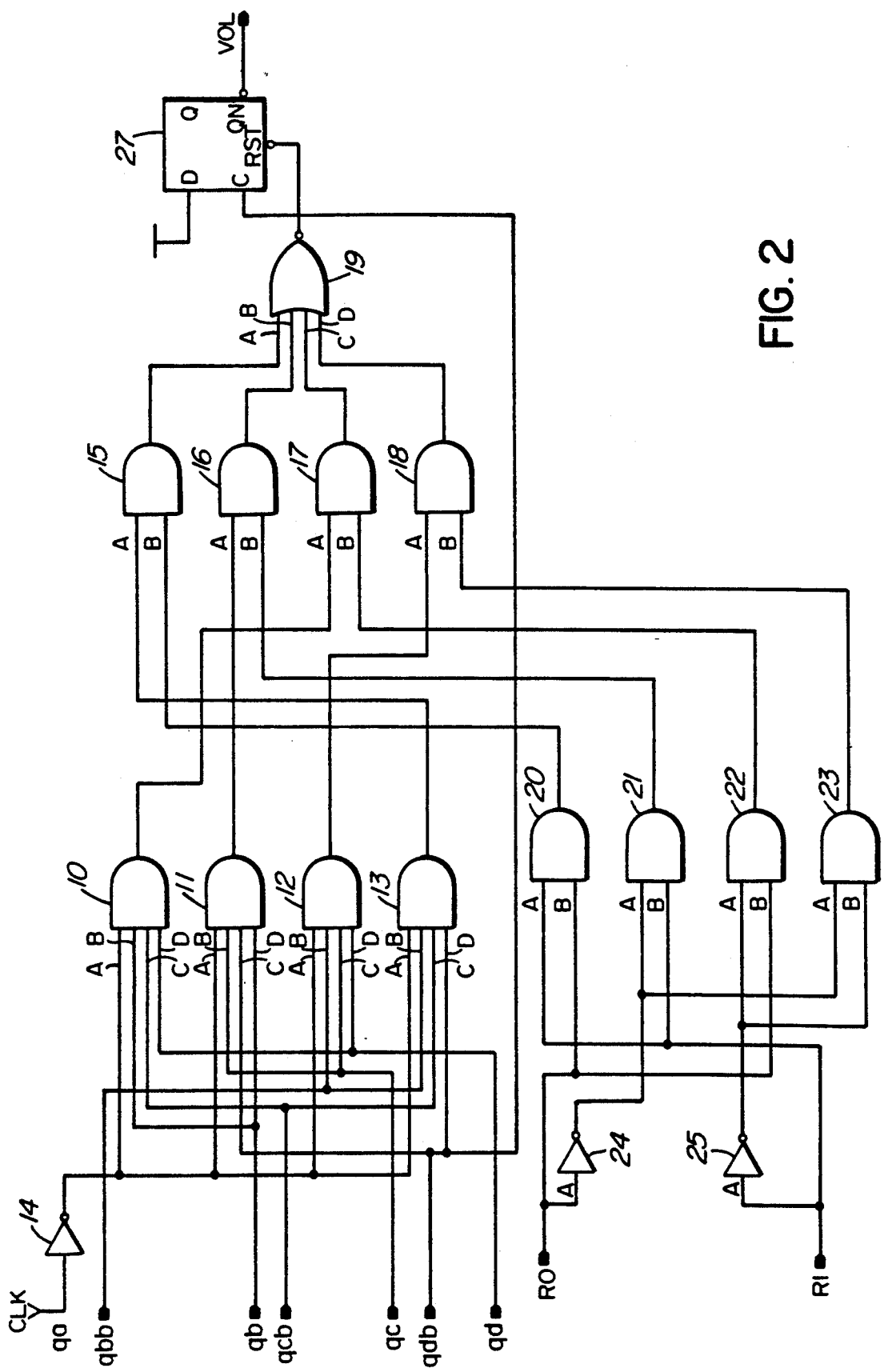
FIG. 2 is a logic diagram of the volume control block of FIG. 1.

FIG. 2 is a logic diagram of the volume control block 2 of FIG. 1. Binary count signals output from binary counter 1 are applied to inputs of AND gates 10, 11, 12 and 13, which have each of their inputs connected to input terminals qbb, qb, qcb, qc, qdb and qd which are binary count output terminals of binary counter 1. Clock synchronizing input pulses of 128 kb/sec are applied to a CLK input, which are passed through inverter 14. The signals at the qbb, qb, qcb, qc, qdb and qd are applied to three of the inputs of AND gates 10-13, and the clock input from the output of inverter 14 is applied to one of the inputs of each of the AND gates 10-13. The arrangements of the binary counter outputs to the inputs of AND gates 10-13 are such that at the outputs of AND gates 10-13 appear the 128 KHz pulses with different delay intervals.

The output signals of AND gates 10-13 are applied to corresponding first inputs of AND gates 15-18 whose outputs are connected to separate inputs of NOR gate 19. The output of NOR gate 19 is connected to the clear (reset RST) input of flip-flop 27.

Second inputs of AND gates 15-18 are connected to the outputs of AND gates 20-23 respectively.

An R0 input is connected to one input of AND gate 20 and 22, and through inverter 24 to an input of AND gates 21 and 23.

Similarly an R1 input is connected to second inputs of AND gates 20 and 21 and through inverter 25 to second inputs of AND gates 22 and 23.

In operation, the controller 6 applies a binary combination to inputs R0 and R1. This is decoded by AND gates 20-23, one of which is thus selected, providing an input to one of AND gates 15-18. As a result the 128 KHz clock signal appearing at the other input of the gate of 15-18 appears at its output, and thus at the output of NOR gate 19 for cyclic periods of time defined by the binary count signal at the input of that gate 15-18. Flip-flop 27 is reset at the rate of the CLK input.

The count signal at input qdb is applied to the C input of flip-flop 27. The result is an output signal of flip-flop 27 which starts at the beginning of a count pulse, repeats at a 128 kb/sec rate and which is divided into 24 equal parts for the 4 gate decoder formed of AND gates 10-13. The pulse length of each 128 kb/sec pulse can in this embodiment be e.g. 3/16 of a pulse, 9/16 of a pulse, 11/16 of a pulse, or 15/16 of a pulse, which ends at the reset instant. The output signal of flip-flop 27 is applied to one input of AND gate 3.

These 128 kb/s pulses of selectable pulse duration are used to form the ringing frequency of e.g. 348 Hz which warbles with a second frequency for a cadence rate of e.g. two seconds on, two seconds off.

Figure 3:
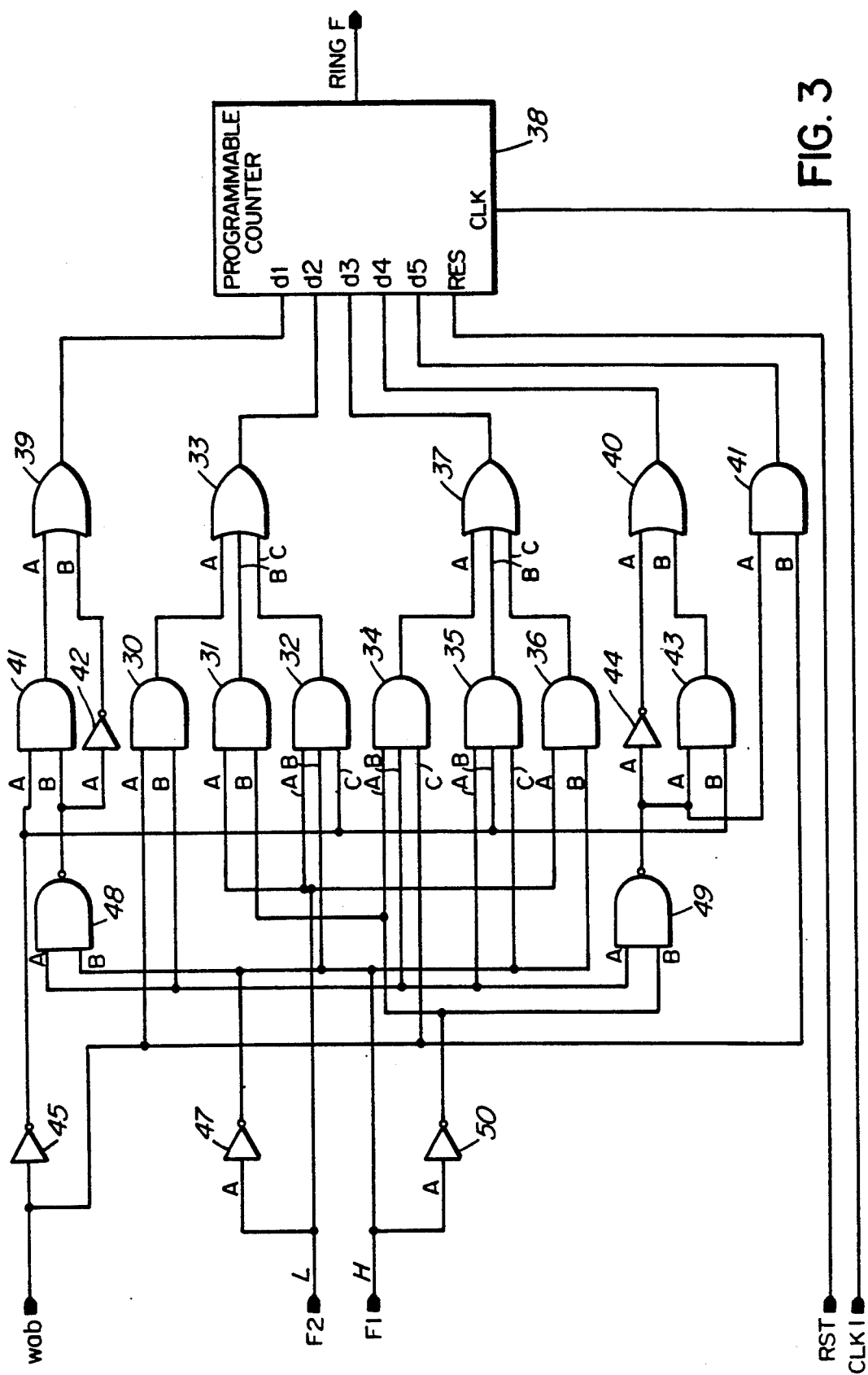
FIG. 3 is a block diagram of the frequency control block of FIG. 1.

Turning now to FIG. 3, a logic diagram of the frequency control block is shown. A group of three AND gates 30, 31 and 32 all have their outputs connected to corresponding inputs of OR gate 33. A group of three AND gates 34, 35 and 36 have their outputs connected to corresponding inputs of OR gate 37. The outputs of OR gates 33 and 37 are connected to corresponding inputs d2 and d3 of programmable counter 38. In addition the outputs of OR gates 39 and 40 are connected to the d1 and d4 inputs of programmable counter 38. The inputs of OR gate 39 are connected to the output of AND gate 41 and to the output of inverter 42, while the inputs of AND gate 40 are connected to the outputs of AND gates 43 and inverter 44.

A wab input is connected to inverter 45. The output of inverter 45 is connected to one input of AND gates 41, 32, 35 and 43. The input wab is also connected to one input of AND gates 30, 34 and 41.

Input F2 is connected to an input of each of AND gates 31, 32 and 36, and through an inverter 47 to an input of AND gates 30, 34 and 35, and also to an input of AND gates 48 and 49. The F1 input is connected to an input of each of AND gates 48, 32, 35 and 36, and through an inverter 50 to an input of AND gate 31, 34 and 49. The output of AND gate 48 is connected to the second input of AND gate 41 and to the input of inverter 42, while the output of AND gate 49 is connected to an input of AND gate 43 and to the input of inverter 44.

A 1 MHz clock signal is applied to the CLK 1 input, which is connected to the clk input of programmable counter 38, while a reset signal from the controller is received at the RST input, which is connected to the RES (reset) terminal of programmable counter 38.

In operation, the controller applies a binary signal to the F1 and F2 inputs, which enables the corresponding gates to which the signal passes. The controller also applies the signal to the wab (warble) input which causes the gates receiving that signal to enable inputs of programmable counter 38.

The particular signal from the controller applied to the F1 and F2 inputs selects the frequency, i.e. one out of four combinations ($2^2$). The signal applied to the wab input selects between the two frequencies, i.e. the F1, F2 and wab inputs causes the circuit to operate like a three input decoder, which can select between eight combinations ($2^3$). The wab signal going high and low at the warble frequency thus allows one out of two different frequencies to be selected. With a one MHz clock signal applied to programmable counter 38, the frequency select and warble inputs, providing a three input code selection, cause the binary signal at the d1-d5 inputs of binary counter 38 to count at a selectable rate, thus outputting a digital signal at e.g. a 348 Hz rate.

Figure 4:
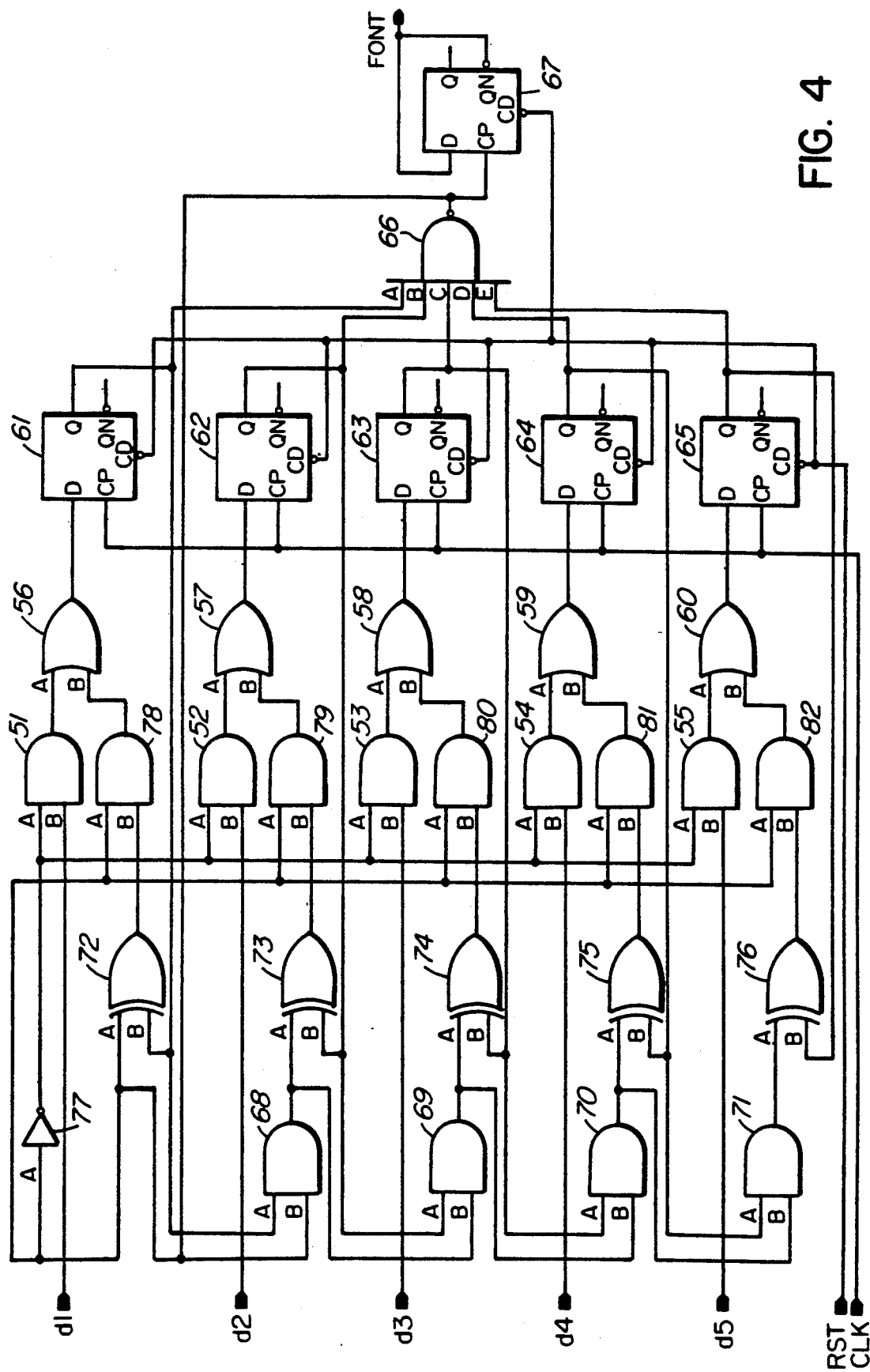
FIG. 4 is a logic diagram of the programmable counter block of FIG. 3.

FIG. 4 is a logic diagram of the preferred form of programmable counter 38, although others could be used instead. The d1-d5 inputs are connected to corresponding inputs of AND gates 51-55 respectively. The outputs of AND gates 51-55 are applied to corresponding inputs of OR gates 56-60 whose outputs are connected to corresponding D inputs of flip-flops 61-65. The Q outputs of D flip-flops 61-65 are connected to corresponding inputs of AND gate 66 whose output is connected to the CP input of flip-flop 67 whose QN output provides the frequency control output signal for application to AND gate 3 (FIG. 1). That signal is also applied back to the D input of flip-flop 67.

The Q outputs of each of flip-flops 61-64 are connected to an input of a corresponding AND gates 68-71 and the Q outputs of flip-flops 61-65 are connected to an input of corresponding EXCLUSIVE OR gates 72-76. The output of AND gate 66 is also connected to the other input of AND gate 68 as well as to the other input of EXCLUSIVE OR circuit 72 and to the input of inverter 77. The output of AND gate 66 is also connected to an input of each of AND gates 78-82, and the outputs of EXCLUSIVE OR gates 72-76 are connected to corresponding second inputs of AND gates 78-82. The output of inverter 77 is connected to a second input of each of AND gates 51-55. The reset lead RST is connected to the CD input of each of flip-flops 61-65 and 67, while the clock input CLK is connected to the CP inputs of flip-flops 61-65. The output of AND gate 66 is connected to the CP input of flip-flop 67.

In operation, the binary signal at leads d1-d5 from the circuit in FIG. 3 are applied to the inputs d1-d5 of FIG. 4, and a 1 MHz clock signal is applied to the CLK lead. The clock signal causes operation of flip-flops 61-65 which change state in accordance with the value applied to leads d1-d5 divided by the intervening gates and form a counter. Gate 66 decodes the state of the counter and generates a pulse which causes the counter to be reloaded with the value at inputs d1-d5. The output pulse sequence of AND gate 66 is divided by two in flip-flop 67. In the example shown FIG. 3, the counter counts to 31, then reloads at 32 count. The output signal of flip-flop 67 is applied to AND gate 3 of FIG. 1.

Figure 5:
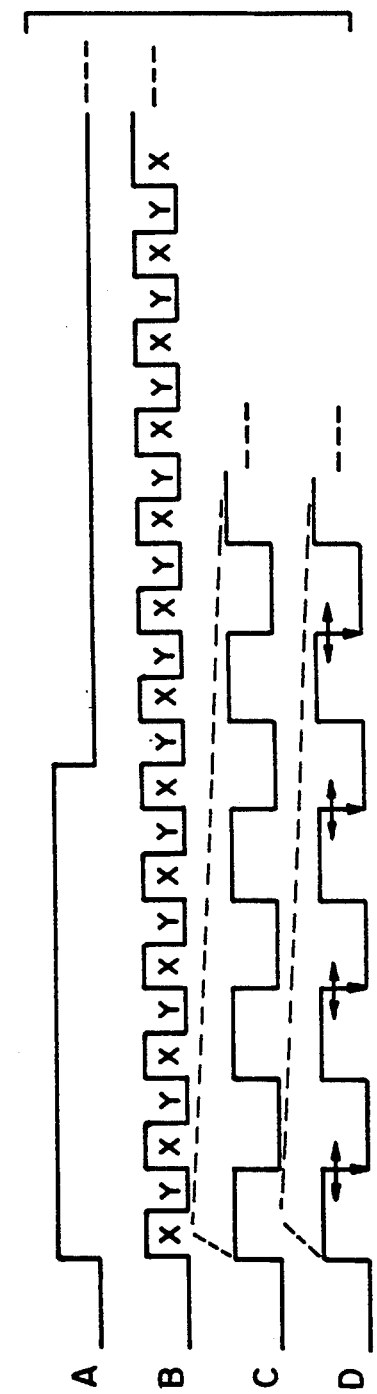
FIG. 5 is a waveform diagram used to illustrate operation of the invention.

FIG. 5 illustrates a group of waveforms which will aid in understanding the result of the above. Waveform A is the cadence signal pulse generated by the controller and applied to an input of AND gate 3, e.g. two seconds high and two seconds low. This provides the common ringing signal envelope heard by a typical telephone user to alert the fact that an incoming call is present.

Waveform B illustrates the warble envelope which is the signal applied to the wab input of FIG. 3. Each successive high level portion labelled X, modifies the signal at d1-d5 to cause the counter to output a 348 Hz signal, and each time the waveform is in the interval Y, the signal at the leads D1-D5 cause the counter to output a signal of 445 Hz.

A limited time portion of waveform B is illustrated as waveform C. The pulse signal of waveform C is the 348 Hz or 445 Hz output signal resulting from programmable counter 38, which constitutes the ringing signal to be reproduced in loudspeaker 5 after averaging in its voice coil.

A small portion of waveform C is reproduced as waveform D. This signal is a 128 kb/sec pulse signal having a reset time illustrated by each vertically downward extending arrow, having a variable pulse length illustrated by the horizontal arrows. The variation in the pulse length of the 128 kb/sec signal provides the control of volume, the apparent volume changes being due to the energy contribution of the 128 kb/sec pulses in making up the 348 Hz or 445 Hz pulses of waveform C.

The modulation of waveform C by waveform D occurs in AND gate 3, and the modulation of the result by waveform A also occurs in AND gate 3. The 128 kb/sec signal is at an inaudible high frequency, and it will not be reproduced in the voice coil of loudspeaker 5. The effect of the voice coil is as an averaging means for the energy content in waveforms C and D, resulting in a digital to analog conversion and acoustic reproduction of the audio frequency ringing signal of 348 Hz or 445 Hz.

While operation has been explained using the ringing frequencies 348 Hz and 445 Hz as examples, it will be understood that other frequencies could be used, and it is suggested that for the purposes of ringing, the range of about 300 to 700 Hz should be used. It will be understood by persons skilled in the art that other frequencies could be used for the desired purposes.

The particular frequencies, volumes and cadence are controlled by a microprocessor, which can be controlled by an input signal transmitted on the subscriber's line from a PABX or central office in a manner such as in U.S. Pat. No. 4,608,686 dated Aug. 26th, 1986, and assigned to Mitel Corporation.

A person understanding this invention may now conceive of alternative structures and embodiments or variations of the above. All of those which fall within the scope of the claims appended hereto are considered to be part of the present invention.

I claim:

1. An alarm or ringing signal generator comprising:
   (a) means for generating a first pulse signal having a predetermined pulse width for defining an alarm signal amplitude;
   (b) means for modulating the first pulse signal with a lower frequency second pulse signal having a frequency defining an alarm or ringing signal frequency;
   (c) means for averaging the modulated first pulse signal and acoustically reproducing the averaged modulated pulse signal to produce said alarm signal.

2. An alarm or ringing signal generator as defined in claim 1 in which the acoustically reproducing means is a loudspeaker and in which the averaging means is a voice coil of said loudspeaker.

3. An alarm or ringing signal generator as defined in claim 2 in which the first pulse signal generating means is a binary pulse counter for producing a plurality of count pulses having pulse widths related to a repetitive binary count, and further including means for controlling the lengths of digital pulses with said count pulses to produce said first pulse signal.

4. An alarm or ringing signal generator as defined in claim 3, further including means for generating plural pulse signals each having a different pulse rate being at least an order lower than the pulse rate of said first pulse signal, and means for providing one of said plural pulse signals as said second pulse signal.

5. A method of producing an alarm or ringing signal comprising: providing a first pulse signal having a predetermined pulse width and frequency to define an alarm or ringing signal amplitude, and modulating the pulse signal with a second pulse signal having a pulse rate at least an order lower than the frequency of the first pulse signal to define the alarm or ringing signal frequency, averaging the modulated first pulse signal and reproducing a result of said averaging in a loudspeaker to provide said alarm or ringing signal.

6. A method as defined in claim 5 in which the averaging and reproducing steps are effected simultaneously by inductance of said loudspeaker.

7. A method as defined in claim 6 including the step of varying the pulse rate of the second pulse signal to provide a warbling alarm or ringing signal.

8. A method as defined in claim 7 including alternating the pulse rate of the second pulse signal between pulse rates.

9. A method of producing a ringing signal for a telephone as defined in claim 5 comprising: designating a different ringing signal for each of a group of telephone users, storing a digital code defining said first and second pulse signal corresponding to each different ringing signal in a memory, receiving a ringing enable signal from a remote location containing a designation of a particular telephone user, retrieving one of said digital codes corresponding to said designation of said particular user from said memory, and enabling a ringing signal generating means with said one digital code to generate a particular ringing signal corresponding thereto.

10. A method of producing a ringing signal for a telephone as defined in claim 5 comprising: designating a particular ringing signal having predetermined frequency, cadence and volume as an alarm, storing a digital code defining said first and second pulse signals corresponding to said alarm in a memory, receiving an alarm digital code and enabling a ringing signal generating means with said digital code to generate said particular ringing signal.

11. A method as defined in claim 10 further including designating a different ringing signal for each of a group of telephone users, storing a digital code corresponding to each different ringing signal in said memory, receiving a ringing enable signal from a remote location containing a designation of a particular telephone user, retrieving one of said digital codes corresponding to said designation of said particular user, and enabling a ringing signal generating means with said one digital code to generate a particular ringing signal corresponding thereto.

12. A method as defined in claim 9 in which said different ringing signals are warbled between at least two different frequencies, the different ringing signals having different amplitudes of their different frequencies.

13. A method of producing an alarm signal as defined in claim 5 comprising: designating a different alarm signal for each person of a group of persons and different alarm conditions, storing a digital code defining said first and second pulse signal corresponding to each different alarm signal in a memory, receiving an alarm enable signal containing a designation of a particular person, retrieving one of said digital codes corresponding to said enable signal from said memory, and enabling an alarm signal generator using said one digital code to generate an unique alarm corresponding to said one digital code.

* * * * *